Aug. 30, 1966

R. M. SLATTERY 3,269,047

MARINE LINE FLOATS

Filed Oct. 3, 1963

INVENTOR.
ROBERT M. SLATTERY
BY Mathis and Graybeal
ATTORNEYS

Aug. 30, 1966 R. M. SLATTERY 3,269,047
MARINE LINE FLOATS
Filed Oct. 3, 1963 2 Sheets-Sheet 2

INVENTOR.
ROBERT M. SLATTERY
BY Mathis and Graybeal
ATTORNEYS

United States Patent Office 3,269,047
Patented August 30, 1966

3,269,047
MARINE LINE FLOATS
Robert M. Slattery, Seattle, Wash., assignor to
John O. Graybeal, Seattle, Wash.
Filed Oct. 3, 1963, Ser. No. 320,596
17 Claims. (Cl. 43—7)

This application is a continuation-in-part of my copending and now abandoned application Serial No. 87,679, entitled, Convolute Float, and filed February 7, 1961.

In general, the invention relates to marine floats, and more particularly relates to resilient and flexible floats of heliciform configuration, especially adapted for use on net float lines or like marine surface lines where the extended length of line, or net ties or the like, make the installation of conventional pierced floats quite time consuming and of doubtful reliability. In addition, floats characteristic of the present invention provide important use advantages in terms of resistance to breakage when net float lines are handled by power equipment such as pulley blocks or winch drums, as is customary in commercial fishing.

Heretofore, customarily used net float line supporting devices have been generally cylindrically shaped, axially bored cork or similarly configured foamed plastic. Spitzli et al. U.S. Patent No. 2,897,625 discloses a float of the latter type, with metal sleeving in the bore to reduce float breakage. This patent, to which reference can be had for a good discussion of the problem of commercial net handling and incident float breakage, indicates that the order of damage to floats during the course of a fishing season can run as high as 70%. With this order of float breakage, a time-consuming repair problem is continually encountered by commercial fishermen, it being impractical to untie the net from the float line and then end thread a replacement float, then retie the entire net to the line. Emergency practice with respect to float replacement has heretofore commonly involved longitudinally splitting a wooden or cork float, then tying or nailing the split halves of the float together around the float line, with doubtful reliability.

In attempting to avoid the problem of practical float replacement, other types of floats which are non-symmetrical with respect to the float line have been used, where the line is tied or otherwise clamped to the side of the float, one variation in this latter respect being shown in Robinson U.S. Patent 2,767,506. However, this type of float is not desirable for supporting the float line of a fishing net or other like surface line, in that such type of float carries the float line somewhat submerged below the surface of the water, and permits fish escapement over the line.

To overcome the foregoing disadvantages as to float breakage and as to the complications of installation of a symmetrical float on a float line with a net tied at intervals thereto, and to also provide a marine float form which is economical to manufacture and is well suited to new net or like marine fabrication as well as replacement use, marine floats of the present invention are characterized by a heliciform configuration, formed of flexible, buoyant material, which can be installed or removed from a float line simply by a rotative or "screw on" action, not encumbered by net ties at intervals along the line, if such are present. The float, having a series of coils or convoluted turns, provides that the float is self-anchoring against longitudinal movement along the float line by virtue of the net web lines being situated between turns when the float is in place, and the flexible, elastically resilient multi-turn nature of the float construction provides that such can flex to any necessary extent as the float line winds tautly onto a winch drum over a power block. Further, a float characteristic of the present invention is to a considerable degree self-adapting to snugly engage a float line in that the heliciform construction provides that the float line engaging inner bore provided by the inner surfaces of the turns of the float can effectively enlarge in the course of installation of the float if the size of the line demands. Also, floats of the present invention, being symmetrical on the float line and characterized by the absence of sharp protrusions, are advantageously non-fouling to a considerably greater degree than various other types of line floats.

Incident to the simple annular helix configuration of the floats of the present invention, such are readily adaptable to economical mass production techniques, such as by extrusion or molding. Yet another advantage of certain forms of the invention is found in the feature that such can be fabricated, as by extrusion techniques, in any desired length for handling and storage, then used in any desired length, being cut to a given replacement size at the time of use. Detailed features and characteristics of the typical forms of the invention disclosed further involve certain closed cell forms of helically configured floats with each turn of the coil-like construction being cross-sectionally either substantially circular or substantially rectangular, with a double helix form comprising two separable, open coil portions which are interthreaded, and with another form of coiled tube-like construction, which is interiorly hollow and pressurizable, as desired. In yet another form, means are optionally provided for lashing the float to a particular point on a float line, should a particular installation merit, as when a given float line is relatively quite small in diameter and not provided with periodic ties so as to permit the float to be self-anchoring.

These and other objects, features, characteristics and advantages of floats according to the present invention will be apparent from the following more detailed description of certain typical and therefore non-limitive embodiments thereof, taken together with the accompanying illustrations of same, wherein like lettering and numerals refer to like parts, and wherein.

Figure 1:
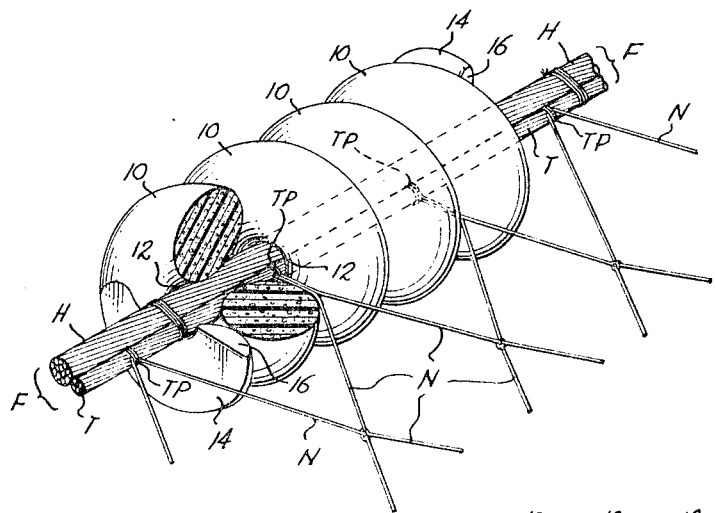
FIG. 1 is an isometric view with a portion broken away for illustration of interior form, showing a cellulate, cross-sectionally circular, heliciform float installed on a typical fishing net float line, the net and its float line being shown fragmentarily.
Figure 2:
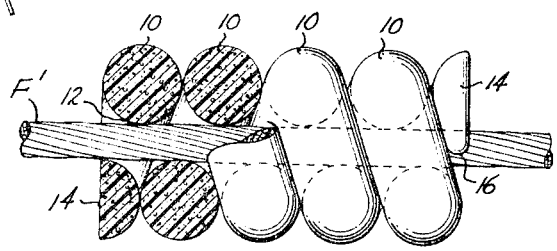
FIG. 2 is a side view with portions broken away for clarity, of the float shown in FIG. 1, illustrating the installation thereof on a single float line without net ties.
Figure 3:
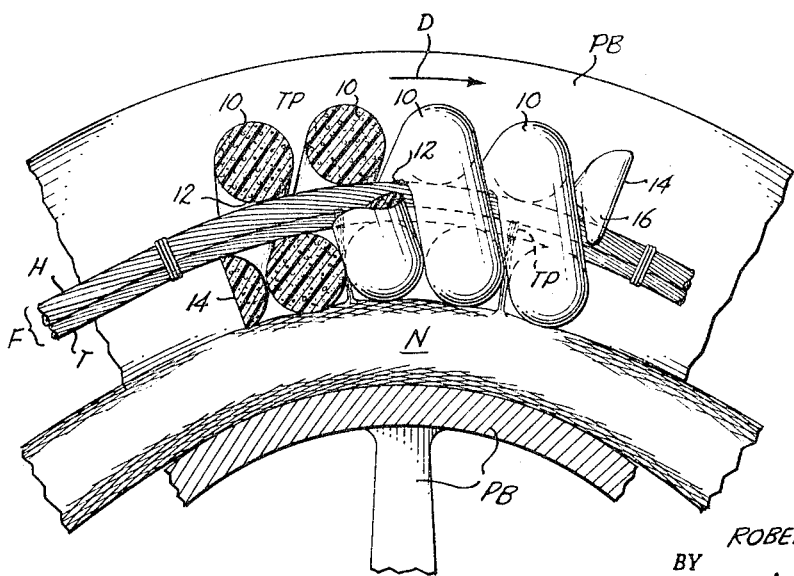
FIG. 3 is a fragmentary view taken cross-sectionally of a power block and showing somewhat schematically the yieldable nature of the float shown in FIG. 1 as the net passes through the block.
Figure 5:
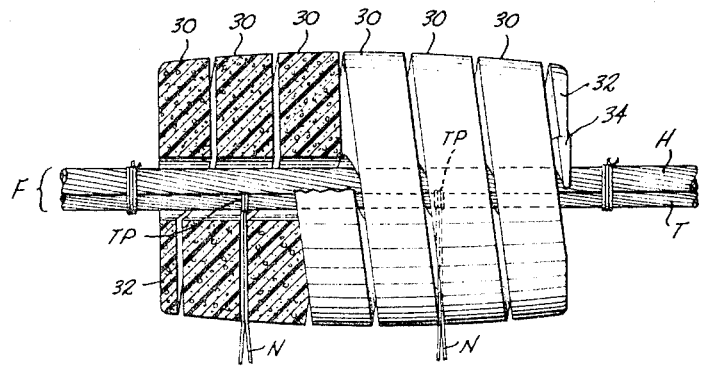
Figure 6:
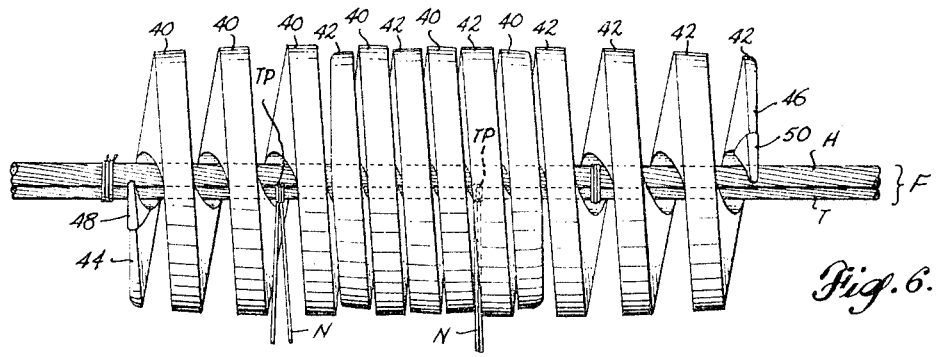
Figure 7:
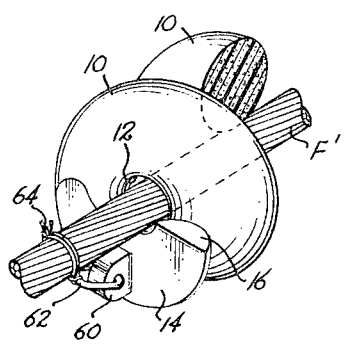

FIG. 5 presents another form of float according to the present invention, being shown in side view with a portion in cross-section, such float having cellulate material in the form of a single helix which is cross-sectionally rectangular, the external shape of the float being essentially cylindrical, such float being installed on the float line of a fishing net in like manner to the float installation illustrated at FIG. 1;

FIG. 6 presents yet a further variation in heliciform construction of a float, with the two separable open helixes thereof being shown in side view and partially assembled together; and FIG. 7 is a fragmentary isometric view on an enlarged scale of the float form illustrated at FIGS. 1–3, modified by attachment thereto of means for lashing the float to a particular point along a float line.

The various floats shown in the drawings are illustrated substantially to scale.

As shown in FIG. 1, a typical fishing net can involve net webbing N tied or lashed at close intervals to various tie points designated TP to a net top line, designated T, which is in turn lashed either tautly or in a looped manner to a haul line designated H. For purposes of reference, the haul line H and top line T can be collectively designated as the net float line F, since such are collectively the line to be supported at the surface of the water by the float means.

As shown in FIG. 1, one typical embodiment of heliciform float according to the present invention has a series of substantially contiguous convolutions or turns 10 of plastic foam of appropriate density and flexibility, each turn being substantially circular in cross section, the convolutions being in the layout of an annular cylindrical spiral, the inner surfaces of the turns 10 providing an inner bore, designated at 12 at certain points, which is substantially the diameter of the float line. As will be apparent, the float shown in FIG. 1 is installable on the net float line F simply by slightly separating one end turn 10 from the adjacent turn and rotatively threading the turns of the float around the float line F and a selected tie point TP, until all turns of the float body are threaded around the line F and the line lies in axial position within the float inner bore. At this point the net lines leading to at least one tie point TP lie between turns of the float body and the float is effectively anchored against longitudinal movement along float line F. Also, in preferred forms of the invention, there is an anchoring of the float body on line F by virtue of the snugness of the inner bore dimension of the float against the line F, although this dimensional relation has been found to be not essential in all instances (note the forms of floats illustrated at FIGS. 5 and 6, in this respect). Such additional snugging or gripping of the float onto the float line F is considered usually advantageous, however, and is the more common installation relationship, particularly since the flexible, spiral form of the float permits considerable self-adjustment of the inner bore of the float to fit a range of sizes of float line F.

Also noteworthy with respect to the form of float illustrated at FIG. 1 is the nature of the terminating end portions of the float. Specifically, each terminating turn 10 desirably leads to a tapering tip 14, which can be truncated as shown at 16, as desired, the tapering cut providing tapered tip 14 being accomplished simply by cutting or forming the terminating turn of the coil substantially along a plane perpendicular to the axis of the inner bore 12. All end forms are thus the same, and as a practical ramification of this, the heliciform configuration can be fabricated of any convenient length, then simply cut to desired float length, either at the time of fabrication or at the time of use.

FIG. 2 serves to illustrate the float of FIG. 1, as applied to a float line F' consisting of but a single line without net ties. From the showing of FIG. 2, it will be apparent that the inner bore 12 of the float snugs against line F' simply by the resilient nature of the float itself. This capability of floats characteristic of the invention is an important consideration where it is desired to place a float at an intermediate point in a long float line used for purposes other than fishing net support, as for example when used as swimming pool safety lines, area or lane marker lines, anchoring and mooring lines, and the like. Such lines are often quite long, and the convoluted float here presented makes possible quick and convenient placement or replacement of any desired number of floats on the line neatly and without end threading.

FIG. 3 serves to illustrate an important operational feature with respect to net floats of the present invention. By reason of the coiled, resilient nature of the float (i.e. its torsional resiliency), the various turns of each float along the float line can yield in a manner providing a "bending" of the inner bore of each float, longitudinally considered. For example, as shown at FIG. 3, a hydraulically driven power block PB, of the type now in common usage for hauling in a net, is rigged overhead of the deck of a boat and exerts a hauling tension on the float line F. Power block PB is shown in FIG. 3 with the curved saddle thereof in cross-section and with one flange of the saddle in the background. As the net and float line are drawn over the saddle, as by rotation of block PB in direction D, each convolute float along the line as it engages the saddle simply flexes sufficiently to adapt itself to the curvature of the float line F and the saddle, gapping slightly between the turns 10 on the outside of the bend. This flexural action is technically termable "torsional deformation," and is to be contrasted to conventional floats with a rigid inner bore, where the ends of the bore are often subjected to fracturing stresses in this operation. As will be apparent, the bending action of the instant floats also occurs in like manner in the situation where the net is hauled in over a deck mounted winch drum.

Another common occurrence as to float breakage is in the situation where the net N gets ahead of the boat and the float line F with its floats are angled around and scrape over the bow of the boat as the net N is being hauled in. In this situation, it will also be apparent that the inherent flexure of the convolute float form effectively minimizes the likelihood of float breakage.

Figure 4:
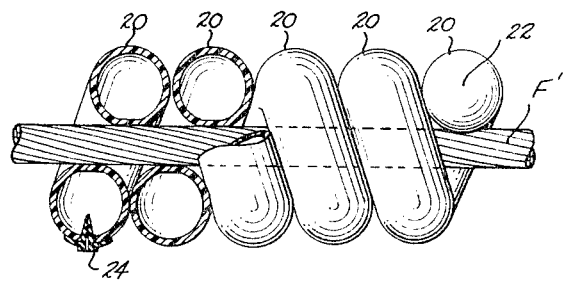
FIG. 4 is a side view similar to the view of FIG. 2, showing a modified form of float, wherein the float construction is of hollow, flexible, coiled tube form, and further showing as a detailed variation the placement of a pressurizing valve in the float body.

FIG. 4 shows another form of convoluted float characteristic of the present invention, the float construction in this instance being of hollow, flexible plastic tubing, closed at the ends to provide an air-tight inner void, for buoyancy. The float, which can be fabricated from a resilient, flexible plastic such as polyethylene, for example, comprises a series of turns 20 with solid walls of suitable thickness, say 1/16 inch, for example, with rounded, closed ends, one such end being shown in elevation at 22. The turns 20 are preferably configured to snug slightly against a float line F', and the float can optionally be provided with inflating means of a type known per se, such as valve 24 so that the float can be suitably pressurized. The type of valve 24 illustrated in FIG. 4, as will be recognized, is of a form in common usage for inflating footballs and the like, accepting a needle type inflating means for pressurization.

FIG. 5 illustrates yet another form of convoluted float typifying the present invention, the float form in this instance comprising a series of convoluted turns 30, each cross-sectionally substantially rectangular, the end turns 30 terminating in tips 32 preferably but not necessarily end coated as at 34 with solid plastic, for durability and ease of threading. The float form shown at FIG. 5 can be fabricated by molding or by radially cutting in a spiral pattern (as with a knife or hot wire) a generally cylindrical block of expanded plastic with an axial bore and with unbroken outer surfaces.

FIG. 6 illustrates a further variation as to a convolute float characteristic of the present invention, having two, separable open heliciform sections rotatable into each other about the float line F. One such section comprises a series of turns 40 and the other such section comprises a series of turns 42, as shown, each set of turns 40 and 42 being relatively separated by about the thickness of the turns. Counter rotation between the sections interlaces the two sections together to form a single convoluted float with an external appearance like the form of float shown at FIG. 5, except with twice as many turns. One advantage incident to the float form shown at FIG. 6 is that the float sections are readily placeable on a float line F without substantial bending of the turns since each section inherently is already gapped a considerable dimension between the turns. As will be apparent, this will permit use of a more rigid float material, if desired, since the turns are relatively more narrow and need not be flexed as much when being installed on the float line. The respective end tips 44 and 46 of end turns 40 and 42 suitably may have respective solid plastic tip coatings 48 and 50, in like manner as tips 34 are provided in the form of float shown at FIG. 5.

FIG. 7 illustrates a variation in float design by means of which the convoluted float of the present invention can be lashed at a particular point on a float line, if desired, the form of float shown for illustration being that of FIG. 1. An end turn 10 of the float has standing out from the tapered surface 14 thereof a lug 60 retaining a lashing eye 62 which is seized to float line F′ by tie 64. This manner of anchoring a float is sometimes desirable where a given float line F′ happens to be substantially smaller than the effective inner bore dimension 12 of the float.

As will be evident, various other techniques can be used for anchoring a somewhat oversize float on a float line F′ without net ties or the like therealong, such as by a lashing around the line F′ and around one intermediate turn 10, or as by knotting or building up a lashing of several turns of smaller line around the line F′, then screwing the float around the knot or lashing to conceal same and anchor the float.

With respect to the physical properties of the closed-cell, expanded plastic foam from which a convolute float according to the invention can be fabricated, the important properties can be generalized as follows.

As to buoyancy, which may be otherwise expressed as density, the expanded plastic should be trapped gas containing, i.e. should be of closed-cell form, in order that the float will have maximum buoyancy, consistent with other desired physical properties. By way of comparison in this respect, most so-called "flexible" plastic foams are sponge-like, with a characteristic connected-cell structure, and are thus inappropriate for purposes of the present invention, having neither sufficient extended buoyancy nor sufficient rigidity.

As to elasticity, which may be otherwise expressed as rigidity, it is important that the expanded plastic convolute float have substantial elastic resiliency. In this respect, the material should have an elastic limit at normal temperature which enables non-permanent deformation of the turns of the float to an extent so that under stress the separation distance between adjacent float turns can at least about equal the diameter of the inner bore of the float. This degree of elastic resiliency permits placement of the float on a float line by rotative threading of the turns of the float onto the line without change in the non-stressed form of the float, i.e. simply by elastic deformation. While the maximum degree of rigidity is determined by the above consideration, it is also important that the plastic nevertheless have substantial structural strength or "toughness" (i.e. a good stress/strain ratio). This is because a plastic foam which is structurally weak will not stand up as well to shearing stress under normal use conditions of the float (such as discussed in more detail below in connection with FIG. 3, for example), and further often has a greater tendency to have a connected-cell rather than closed-cell structure.

With reference to relative rigidity or flexibility, expanded plastics or plastic foams have been categorized as "rigid," "semi-rigid" and "flexible" (cf. the text entitled "Polyurethanes," by Bernard A. Dombrow, published by Reinhold Publishing Corp., 1957, for example). To date, however, there appears to be no clear-cut definitions or standardization as to the physical properties of these various types of foams. For purposes of defining suitable expanded plastics for practice of the present invention, it is considered that floats of the present invention should utilize "semi-rigid" plastic foam, since "rigid" foams in general tend to be unduly brittle and do not have sufficient elasticity to be easily installed on a line by threading, and since "flexible" foams tend to be less buoyant and structurally undesirable. As to a practical quantitative definition of the term "semi-rigid" as applied to plastic foams suitable for the invention, the dominant physical property is the elastic limit (i.e. the maximum strain the material can take without material permanent deformation), and the elastic limit of the plastic foam should be such that the elastic limit thereof at normal temperature (70° F.) is reached upon compression deformation of the material to the extent of from about 5% to about 50% of the undeformed (i.e. non-stressed) dimension thereof.

With regard to the chemical constituency of suitable plastic foams, it is to be recognized that a wide variety of expanded plastics are available which can be fabricated with the desired physical properties. Thus, suitable expanded plastics are in general definable as elastomeric expanded polymers, including expanded polythenes, expanded polystyrenes, expanded polyvinyls, and expanded polyurethanes. By way of more specific examples, one suitable commercially available expanded plastic which can be fabricated to have the desired physical properties is the expanded polyvinyl chloride foam marketed by U.S. Rubber Company under the proprietary designation Ensolite, a closed-cell foam formable with a non-cellular surface skin. Another suitable closed-cell material, now in extensive use as a "rigid" form in the fabrication of the general type of float disclosed in the above-mentioned Spitzli et al. Patent No. 2,897,625, is the expanded polyvinyl chloride foam marketed by B. F. Goodrich Company under the proprietary designation Spongex. Another known chemical type of expanded plastic suitable for practice of the present invention is expanded polythene, now employed as an extruded insulating core in radio frequency coaxial cable, such as employed for transmitter-to-antenna power transfer in electromagnetic communications systems. For a text discussion of such use of expanded polythene, reference can be made to "Polythene," by A. Renfrew et al., published by Interscience Publishers, Inc., New York, N.Y., 1957, at chapter 25. Yet another type of suitable expanded plastic which can be fabricated as a closed-cell, semi-rigid foam is the expanded polyurethane foam disclosed in Du Pont U.S. Patent No. 2,787,601, for example.

As will be apparent, the specific plastic foams referred to above are simply typical of the numerous types and grades of foams available to the art, and selection of a particular foam for practice of the present invention can be made on the basis of available foam forming materials and the known or ascertainable physical properties characteristic of various mixes of prepolymers, catalysts (when used) and blowing agents.

With regard to the nature of the blowing agent for expanding the polymer, any suitable blowing agent affording an essentially closed-cell foam structure can be used. In general, it is considered preferable to use a dispersed solid form of blowing agent in the prepolymer mix, such as sodium bicarbonate ($NaHCO_3$) or 1–3 diphenyltriazene (also known by the proprietary term Unicel), since gaseous blowing agents such as carbon dioxide and nitrogen tend to produce a foam structure of the connected-cell type.

As to forming techniques for expanded plastic floats according to the invention, such as shown at FIG. 1, the floats may suitably be formed by molding, by extrusion or by machining techniques.

As an example of a fabrication by molding, a longitudinally split mold of any desired length can be made up to have opposed separable external halves configured with a spiral rib to form the external surfaces of the float with an end supported internal mold member configured with a spiral rib to form the internal surfaces of the float. With the mold members coated with a suitable release agent, and wtih the ribs of the external and internal mold members assembled in substantially abutting relation, an appropriate quantity of catalyzed prepolymer and blowing agent mix is injected into the mold. After the mix has expanded and cured, the external mold halves are removed and the internal mold member is broken away from and threaded out of the float core. Any incidental thin line of connecting material between the float turns, which may have occurred because of mold member separation, is then cut or otherwise broken, leaving the float in completed form except for surface pigmentation, if desired. As will be apparent, a spiral float foam can be molded to be any reasonable length desired, and as a matter of fabrication economy it is preferable to mold the floats in lengths of several feet (say in 6' or 12' lengths), the molded foam being thereafter cut to desired unit length. Float stock fabricated in extended lengths, say in 6' lengths, can be easily handled and stored on board a fishing vessel, for example, to provide a supply of spare floats for net float replacement, being cut to length as needed.

As an example of forming of spiral floats by an extrusion technique, an extrusion die of helical form can be used, with a catalyzed prepolymer and blowing agent mix pressure fed to the die. Rather than having the blowing agent in the prepolymer mix the blowing agent can be injected and mixed into the prepolymer mix in the mix flow path immediately ahead of the die. Surface lubrication of the die, in a manner known per se, should also be provided, and the die should have a sufficient number of turns for the mix to be blown and cured to a substantial extent before leaving the die. After continuous extrusion of the float stock, it is then simply cut to desired unit float or float stock length. Except for the configuration of the die, it will be recognized that the blowing-extrusion technique here involved is similar to that employed in the extrusion of expanded plastic coaxial cable insulation.

As an example of forming foamed plastic floats in spiral pattern by a machining technique, a cylindrical or generally cylindrical hollow bore preform of expanded plastic can be cut in spiral pattern simply by rotatively feeding the preform past a hot wire or knife disposed to substantially intersect the bore at the angle of incline of the desired spiral. Another way of machining a cylindrical preform of expanded plastic is to guide and rotatively feed the preform past an electrically heated anvil of substantially I-shaped cross-section with curved inner and outer flanges to respectively form the inner and outer surfaces of adjacent turn halves while the flange joining segment of the anvil performs the between-turns cut. In this fabrication arrangement, the anvil inner flanges are arranged on arcs with a radius of curvature conforming to the radius of the inner bore of the float to be formed and the anvil outer flanges are correspondingly arranged on arcs with a radius of curvature conforming to the radius of the outer surface of the float. The spiral float stock thus fabricated has turns of substantially rectangular cross-section, and the inner core cut by the inner flanges of the anvil can be removed from the stock by endwise pulling or by air jet. Use of such a cutting anvil is advantageous from the point of view of being able to cut the desired float form from preformed foam stock having no preformed hollow bore.

As will also be apparent, the spiral floats of the invention can be fabricated to be any desired color, either by adding pigmentation to the pre-polymer mix or by a surface coating applied after forming, so as to either harmonize (e.g. by use of blue-green coloring) or contrast (e.g. by use of a fluorescent red or fluorescent yellow coloring) with the aquatic environment in which the floats are used.

From the foregoing, various other functionally equivalent modifications and adaptations of floats characteristic of the invention, and of fabrication techniques therefor, will be apparent to those skilled in the art and are to be considered within the scope of the following claims.

What is claimed is:

1. A marine float in the form of several substantially contiguous turns of buoyant, trapped gas containing, elastically resilient material with said turns defining an axially extending inner bore of a size to snugly grip a marine float line, said buoyant material having an elastic limit at normal temperature enabling non-permanent deformation of the turns of the float to an extent so that under stress the separation distance between adjacent turns of the float can at least about equal the diameter of said inner bore, permitting placement of the marine float line snugly in said axial bore by rotative threading of the turns of the float onto the line without permanent deformation of the float, the substantially contiguous turns of the float when thus placed on the line being individually yieldable with the line without permanent deformation when the line is subjected to repeated axial flexure under tension.

2. A marine float according to claim 1, wherein said buoyant material is an expanded plastic wherein the elastic limit of the expanded plastic at normal temperature is reached upon compression deformation of the material to the extent of from about 5% to about 50% of the undeformed dimension thereof.

3. A marine float according to claim 1, wherein said float consists essentially of closed cell, semi-rigid plastic foam.

4. A marine float according to claim 3, wherein said plastic foam is an expanded polymer, said expanded polymer being selected from the group consisting of expanded polythenes, expanded polystyrenes, expanded polyvinyls and expanded polyurethanes.

5. A marine float according to claim 1, wherein said float is interiorly of closed cell form, with a non-cellular skin.

6. A marine float according to claim 1, wherein said float is a hollow, air-tight plastic tube.

7. A marine float according to claim 1, wherein the turns of the float are subtantially circular in cross-section.

8. A marine float according to claim 1, wherein the turns of the float are substantially rectangular in cross-section.

9. A marine float according to claim 1, wherein the end turns of the float terminate in tapered tips.

10. A marine float according to claim 1, wherein said turns comprise at least three complete turns, with each such turn being of uniform cross-section throughout.

11. A marine float in the form of a buoyant, hollow, air-tight, elastically resilient plastic tube having several substantially contiguous turns defining an axially extending inner bore, said turns having an elastic limit at normal temperature enabling non-permanent deformation of the turns of the float to an extent so that under stress the separation distance between adjacent turns of the float can at least about equal the diameter of said inner bore, permitting placement of a float line in said axial bore by rotative threading of the turns of the float on to the line without change in the non-stressed form of the float.

12. A marine line supporting float comprising two separable, helical forms of buoyant, trapped gas containing, elastically resilient material, each such form being an open coil with the spacing between the turns substantially equaling the thickness of the turns, such two coil forms being adapted to be rotatably turned into each other about a float line, making a single convoluted float asembly for the line when thus interlaced.

13. In combination with a marine line, a marine float in the form of several substantially contiguous turns of buoyant, trapped gas containing, elastically resilient material, the said turns defining an axially extending inner bore snugly gripping said line, said buoyant material having an elastic limit at normal temperature enabling non-permanent deformation of the turns of the float to an extent so that under stress the separation distance between adjacent turns of the float can at least about equal the diameter of said inner bore, permitting placement of the marine float line snugly in said axial bore by rotative threading of the turns of the float onto the line without permanent deformation of the float, the substantially contiguous turns of the float when thus placed on the line being individually yieldable with the line without permanent deformation when the line is subjected to repeated axial flexure under tension.

14. In combination with a fishing net float line with net webbing secured thereto at close intervals, a net float comprising a series of substantially contiguous turns of buoyant, trapped gas containing, elastically resilient material with the float line positioned axially within the inner bore defined by said turns and with the net webbing extending laterally between certain of the turns to maintain the float at the desired location on said net float line.

15. In combination with a fishing net float line with net webbing secured thereto at close intervals, a series of net floats arranged in spaced relation along the net float line, each of said floats comprising several substantially contiguous turns of buoyant, trapped gas containing elastically resilient material with the float line positioned axially within the inner bore defined by said turns and with the net webbing extending laterally between certain of the turns of each float to maintain the floats at desired locations on said net float line.

16. In combination with a fishing net float line with net webbing secured thereto at close intervals, a net float comprising a series of substantially contiguous turns of buoyant, trapped gas containing, elastically resilient material with the float line positioned axially within the inner bore defined by the inner surfaces of said turns and with the net webbing extending laterally between certain of the turns, the inner bore defining inner surfaces of said turns being in compressive engagement with said float line, with such compressive contact of the turns with the float line and the net webbing extending between the turns serving to maintain the float at the desired location on said float line.

17. In combination with a fishing net float line with net webbing secured thereto at close intervals, a net float comprising a series of substantially contiguous turns of closed cell, semi-rigid, plastic foam with the float line positioned axially within the inner bore defined by the inner surfaces of said turns and with the net webbing extending laterallly between certain of the turns, the inner bore defining inner surface of said turns being in gripping engagement with said float line, the gripping engagement of the turns with the float line and the net webbing extending between the turns conjunctively serving to maintain the float at the desired location on said float line.

References Cited by the Examiner

UNITED STATES PATENTS

| | | | |
|---|---|---|---|
| 419,574 | 1/1890 | Vasseur | 43—44.92 |
| 852,135 | 4/1907 | Obee | 43—9 |
| 1,842,490 | 1/1932 | Pysher | 43—42.22 |
| 2,251,721 | 8/1941 | Shepherd | 43—43.1 |
| 2,501,634 | 3/1950 | Rector | 43—44.89 |
| 2,540,831 | 2/1951 | Pfleumer. | |
| 2,599,973 | 6/1952 | Bujaky | 43—43.1 |
| 2,897,625 | 8/1959 | Spitzli et al. | 43—43.1 |

SAMUEL KOREN, *Primary Examiner.*

W. H. CAMP, *Assistant Examiner.*